3,573,020
GLASS-CERAMIC ARTICLE AND METHOD
Bruce R. Karstetter, Painted Post, N.Y., assignor to Corning Glass Works, Corning, N.Y.
No Drawing. Continuation-in-part of application Ser. No. 365,203, May 5, 1964. This application Sept. 30, 1968, Ser. No. 763,966
Int. Cl. C03c 3/22
U.S. Cl. 65—30                                                6 Claims

ABSTRACT OF THE DISCLOSURE

This invention relates to the strengthening of glass-ceramic articles in which the crystal content thereof comprises the predominant part of the articles and containing nepheline as the principal crystal phase. The strengthening is effected through the conversion of at least part of the nepheline crystals in a surface layer of the article to low expansion lithium alumino-silicate-type crystals such as beta-eucryptite and beta-spodumene solid solution type crystals, this conversion causing the surface layer to have a lower coefficient of thermal expansion than the interior portion of the article and thereby creating an integral surface compression layer in the article. The transformation of nepheline crystals to the beta-eucryptite type crystals is accomplished through an ion exchange reaction taking place within a surface layer of the article wherein lithium ions from an external source are exchanged for sodium ions in the nepheline, this exchange itself being undertaken at a high temperature or this exchange being undertaken at a low temperature and being followed by a high temperature heat treatment.

---

This application is a continuation-in-part of my pending application, Ser. No. 365,203, filed May 5, 1964, now abandoned.

The theoretical concepts and the practical aspects relating to the production of glass-ceramic articles are discussed in U.S. Pat. No. 2,920,971 and reference is made to that patent for more details as to manufacturing techniques for and the physical structure of glass-ceramic articles. In general, the production of glass-ceramic articles involves three steps: (1) a glass-forming batch commonly containing a nucleating agent is melted; (2) the melt is simultaneously cooled and shaped into a glass article of desired dimensions; and (3) this glass article is exposed to a particular heat treating schedule which causes nuclei to be first developed in the glass which provide sites for the growth of crystals thereon as the heat treatment is continued.

This crystallization in situ of the glass article, resulting through the substantially simultaneous growth of crystals on countless nuclei, imparts a structure to a glass-ceramic article consisting of relatively uniformly-sized, fine-grained crystals homogeneously dispersed in a residual glassy matrix, the crystals comprising the predominant proportion of the article. Thus, glass-ceramic articles are commonly conceived as being at least 50% by weight crystalline and, frequently, are actually over 90% by weight crystalline. Such high crystallinity yields a product exhibiting chemical and physical properties normally quite different from those of the parent glass and more nearly approaching those characterizing a crystalline article. Finally, the very high crystallinity of the glass-ceramic article leaves a residual glassy matrix having a composition much different from that of the parent glass since the components making up the crystals will have been precipitated therefrom.

The crystal phases grown in a glass-ceramic article are contingent upon the composition of the parent glass and the heat treatment utilized. Typical soda-type nepheline glass-ceramic articles and their production are disclosed in U.S. Pat. No. 3,146,141 filed Nov. 23, 1959 in the name of H. D. Kivlighn and assigned to a common assignee.

The term "nepheline" has been employed to designate a natural mineral having a crystal structure classified in the hexagonal crystal system and identified by the chemical formula (Na, K)AlSiO$_4$. However, it has been pointed out by Donnay et al. that the mineral nepheline exists in a wide range of solid solutions, the extent of which is not even fully brought out by the above formula (Paper No. 1309 of the Geophysical Laboratory entitled "Nepheline Solid Solutions").

A similar situation exists in the glass-ceramic art. Here again, the term "nepheline" is employed to designate a rather wide range of solid solution crystal phases having characteristics corresponding to those of the mineral. While the crystals may vary considerably in composition, they are essentially sodium-aluminum-silicate or sodium-potassium-aluminum-silicate crystals in the hexagonal system and have a common reflection peak pattern when studied by X-ray diffraction pattern analysis. It will be understood, that, while any nepheline crystal will exhibit a characteristic pattern of reflection peaks, the spacing and intensity of these peaks may vary somewhat depending on the nature of the crystal phase.

The diffusion of ions in any medium is a direct function of the structure of the medium itself. Hence, whereas a crystal has a long range ordered structure of ions, glass has only short range order and has even been deemed to consist of a random network of ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$, $MgO$, $CaO$, $BaO$, etc.) some of the shared corners (Si—O—Si bonds) are believed broken and oxygen ions are formed which are connected to only one silicon ion. The modifying ions remain in interstitial positions or structural vacancies. In modified aluminosilicate glasses, nonbridging oxygen ions are believed less common because as modifying ions are added to silicate glasses aluminum replaces silicon in the three-dimensional corner shared tetrahedral network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modifier cation positions is variable and the number of cages is large with respect to the number of modifying ions. Therefore, it is likely that during ion exchange in a molten salt bath a small ion will jump out of a cage and a large ion will jump into another cage, very possibly a larger one. Even if the exchangeable ion in the glass and the ions in the molten salt are similar in size, it is likely that an ion leaving one cage will be replaced by an ion entering a different and previously vacant cage. Thus ion exchange phenomena in a glassy network are structurally random and there is no guarantee that certain structural vacancies or positions filled before exchange will be filled after exchange.

The concept of exchanging ions within a crystal structure has been appreciated for many years. The term "ion exchange," as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchanging species but also of the structure of the crystalline phase undergoing exchange. When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitutions in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

The discovery that ion exchange can be effected in glass-ceramic materials is disclosed in application Ser. No. 365,117, filed May 5, 1964 in the name of R. O. Voss, entitled "Glass-Ceramic Article and Method," now abandoned, and assigned to a common assignee. This application specifically discloses the capability of glass-ceramic materials containing a beta-spodumene type crystal phase to be strengthened by an ion exchange in the crystal whereby lithium ions are replaced by a larger ion. The application explains, however, that such strengthening by ion exchange is of a selective nature, that is not effective in all glass-ceramic materials.

The present invention is concerned with a distinctly different principle or technique of strengthening wherein a core or body portion of material having a relatively high coefficient of thermal expansion is integrally or adherently encased in a thin surface layer of a material having a lower coefficient of thermal expansion. It is more particularly concerned with a specific form of this technique wherein a low expansion surface layer is synthesized in situ on the article by ion exchange treatment at an elevated temperature. This principle of strengthening and its application to glass articles are disclosed in U.S. Pat. No. 2,779,136 granted to H. P. Hood and S. D. Stookey.

I have now discovered that the alkali metal ions in the crystal phase of a nepheline-type glass-ceramic material can be exchanged with lithium ions in contact with the glass-ceramic surface, and that the exchange can be effected over a rather wide range of temperatures. I have further found that if the exchange is effected at temperatures over about 750° C., or if the material is heated to such a temperature after this exchange, the nepheline crystal of modified composition (that is, the nepheline crystal containing lithium ions) is converted to a crystal in the hexagonal system having the general characteristics of a beta-eucryptite type crystal and therefore designated as such or to a crystal in the tetragonal system having the general characteristics of a beta-spodumene solid solution crystal or to a combination of these two. In particular, such conversion of the crystal phase creates a material having a relatively low thermal coefficient of expansion. As a consequence, I have further found that, if the ion exchange and crystal conversion is confined to a surface layer on the glass-ceramic article, the expansion differential causes compressive stresses to develop as the article is cooled with consequent strengthening of the glass-ceramic article.

Based on these and other discoveries, my invention is a glass-ceramic article composed of a central or core portion characterized by a nepheline crystal phase and an integral, compressively stressed, surface layer which is characterized by a crystal phase composed in part at least of low expansion lithium aluminosilicate-type crystals such as beta-spodumene and/or beta-eucryptite type crystals. The invention further includes a method of strengthening a glass-ceramic article characterized by a nepheline crystal phase which comprises replacing at least a portion of the alkali ions in the crystal phase in a surface layer on the article by lithium ions, and heating the article so modified at a temperature about 750° C. to synthesize beta-eucryptite and/or beta-spodumene type crystals in situ in the surface layer.

The present invention is not concerned with the manner in which the glass-ceramic material is originally formed and may employ any glass-ceramic material containing a nepheline crystal phase regardless of its particular composition or method of formation. In general, materials of this nature are produced by initially melting and forming a glass of suitable composition for conversion to the desired glass-ceramic material. The article thus produced is then subjected to thermal treatment in accordance with a predetermined time-temperature schedule adapted to initiate development of the characteristic nepheline crystal phase throughout the article.

For example, the previously mentioned Kivlighn patent provides a special nucleating agent in the glass as originally melted. A thermal treatment schedule is then selected to provide a nucleation stage during which extremely fine particles of this agent are thought to separate from the glass and serve as nuclei for subsequent development of the nepheline crystals that characterize the glass-ceramic product. Nucleation may be achieved by either holding the glass article at a temperature of around 850° C. for a period of time, or increasing the temperature of the article at a sufficiently slow rate over a given range, e.g. 800°–900° C., to produce a similar effect within the glass. After nucleation, the temperature may then be raised to a temperature within the range of 1000°–1100° C. and again held to permit development of the nepheline crystal phase.

In accordance with the present invention, a glass-ceramic article characterized by such a nepheline crystal phase is brought into intimate contact with a material containing an exchangeable lithium ion for a sufficient time to effect an exchange between the alkali metal ions of the nepheline crystal and the lithium ions within a surface layer on the glass-ceramic article. The form of the contacting lithium material is not critical, but a fused molten salt bath is generally most convenient and effective to use. The ion exchange is effected at temperatures ranging from 450° C. to 900° C. Even lower temperatures may be employed providing suitable materials are available. Where the ion exchange is effected at a temperature below about 750° C., the article must subsequently be heated above this temperature in order to effect the desired conversion of a substituted nepheline crystal to a beta-eucryptite and/or beta-spodumene crystal.

Reference to an exchangeable lithium ion in this application reflects a lithium ion that can migrate or diffuse to a finite depth in a material in exchange for a sodium ion under the combined activation of a chemical force (differential ion concentration) and a physical force (heat and/or electrical potential).

It has been observed that glass articles tend to spall under some conditions of treatment. This is believed to be due to development of too sharp a stress gradient in the article surface. It may be alleviated by use of lower ion exchange temperatures, cooling slowly after development of the crystal phase, by suitable dilution of the lithium salt bath with another salt such as a sodium salt, or preferably by a combination of such measures.

A sufficient ion exchange for strengthening is obtained with treatment times as short as one minute, and optimum strengthening generally occurs with a treatment time of about 5 minutes. Longer treating times generally provide a lesser degree of strengthening and frequently cause deterioration of the product surface by spalling.

The invention is further described by reference to a series of experiments carried out on a typical nepheline glass-ceramic material.

A glass was melted from a batch of raw materials (including sand, alumina, sodium nitrate, magnesia, titania, and arsenic oxide) adapted to produce a glass having the following calculated composition by weight on an oxide basis: 49.4% $SiO_2$, 16.9% $Na_2O$, 25.9% $Al_2O_3$, 2.2% MgO, 5.1% $TiO_2$, and 0.6% $As_2O_3$. The glass was melted in a conventional melting unit at about 1600° C. and drawn into quarter-inch diameter cane which was then cut into short lengths suitable for strength measurement purposes.

The glass cane was then converted to the glass-ceramic state by treatment in accordance with the following schedule:

Heat at 300° C./hr. to 850° C.,
Hold at 850° C. for 4 hours,
Heat at 300° C./hr. to 1020° C.,
Hold at 1020° C. for 4 hours.

The structure of the crystallized cane was examined employing X-ray diffraction analysis accompanied with replica and transmission electron micrographs. Each cane sample examined was greater than about 70% by weight crystalline with nepheline comprising by far the majority of crystals. Less than about 5% by weight of anatase was also observed.

The glass-ceramic cane samples thus produced were divided into sets of 6. Each set was then subjected to an ion exchange treatment by immersion in a molten salt bath, the time-temperature schedules of treatment being varied to provide an indication of relative effectiveness.

In general, the ion exchange treatments may be considered as either high temperature or low temperature. The former type was characteristically conducted with a salt bath at a temperature above 750° C., whereas the latter, or low temperature treatment, was carried out in a bath at a temperature below 750° C.

For high temperature treatment, a molten salt bath composed of a mixture of lithium and sodium sulfates was employed. One such bath contained a mixture of 80% $Li_2SO_4$ and 20% $Na_2SO_4$ by weight, while a second bath contained a mixture of the salts on a 1:1 mole basis. For low temperature treatment, a lithium nitrate ($LiNO_3$) salt bath was employed with additions of sodium nitrate ($NaNO_3$) in varying amounts.

It will be understood that the strengthening layer of low expansion, lithium aluminosilicate-type crystal phases was produced directly in the high temperature bath treatment. In the low temperature ion exchange, however, the geometric pattern of the crystal remained essentially unchanged, but with a lithium ion replacing a sodium ion in the nepheline-type crystal. In order to develop a lithium aluminosilicate-type crystal of lower thermal expansion coefficient and thereby strengthen the body, it was necessary to heat the ion exchanged cane to a temperature above 750° C.

At the conclusion of the strengthening treatment, each cane sample was subjected to a severe form of surface abrasion wherein a group of cane samples was mixed with 200 cc. of 30 grit silicon carbide particles and subjected to a tumbling motion for 15 minutes in a Number 0 ball mill jar rotating at 90–100 r.p.m. Each abraded cane sample was then mounted on spaced knife edges in a Tinius Olsen testing machine and subjected to a continuously increasing load intermediate the supports until the cane broke in flexure. Based on the measured breaking load, a modulus of rupture (MOR) value was calculated for each individual cane and an average value determined for each set of cane samples.

Since the strength of these articles is a function of the integral surface compression layer developed thereon by means of the ion exchange process, and inasmuch as essentially all service applications for these articles will cause some surface injury thereto even if only that sustained in normal handling and shipping, the permanent or practical strength of the articles is that which is exhibited after considerable surface abrasion. Therefore, the above-described tumble abrasion test was devised to simulate the surface abuse which might be experienced by glass-ceramic articles in actual field service. In order to insure satisfactory abraded strength to the article, the depth of the surface compression layer developed is at least 0.001". This depth can be measured through electron microscope examination of a cross-section of the article.

The following table summarizes the relevant data for several typical sets of cane samples and their treatment. In the table, there is successively presented the composition of the salt bath employed (the numbers indicating the weight or mole percent of the separate salts as indicated above), the temperature in degrees centigrade at which the bath was maintained, the length of time the samples were immersed in the bath, the average calculated MOR value for the set after strengthening and abrading, and the appearance of the cane surface in terms of spalling.

TABLE I

| Bath | Temp., °C. | Time, min. | MOR×10⁻³ p.s.i. | Spalling |
|---|---|---|---|---|
| 50-50 | 900 | 1 | 25 | None. |
| 50-50 | 900 | 2 | 24 | Do. |
| 50-50 | 900 | 5 | 16 | Slight. |
| 50-50 | 900 | 10 | 19 | Severe. |
| 80-20 | 756 | 2 | 14 | None. |
| 80-20 | 756 | 5 | 21 | Do. |
| 80-20 | 850 | 2 | 14 | Do. |
| 80-20 | 850 | 5 | 24 | Severe. |
| 80-20 | 900 | 1 | 28 | Slight. |

By way of reference, the average MOR for comparable abraded, untreated cane samples of nepheline glass-ceramic is on the order of 10,000 p.s.i.

Table II presents, in a manner similar to that employed in Table I, relevant data for several sets of samples subjected to typical low temperature ion exchange treatment, that is ion exchange below 750° C. As indicated earlier, a lithium nitrate salt bath with varying additions of sodium nitrate was employed. In the table, the numbers in the column entitled "bath" are, successively, the mole percent of $LiNO_3$ and $NaNO_3$. This table also differs in that there are two additional columns setting forth the temperature in degrees C. and the time in minutes of the heat treatment subsequent to ion exchange.

TABLE II

| Bath | Bath temp., °C. | Time, min. | Heat treatment Temp., °C. | Time, min. | MOR×10⁻³ p.s.i. | Spalling |
|---|---|---|---|---|---|---|
| 100-0 | 450 | 2 | 875 | 5 | 33 | None. |
| 100-0 | 450 | 5 | 875 | 5 | 38 | Do. |
| 100-0 | 450 | 5 | 800 | 5 | 30 | Slight. |
| 95-5 | 582 | 5 | 850 | 5 | 31 | None. |
| 95-5 | 582 | 10 | 850 | 5 | 27 | Do. |
| 75-25 | 450 | 5 | 850 | 5 | 35 | Do. |
| 75-25 | 450 | 15 | 850 | 5 | 29 | Do. |
| 75-25 | 450 | 5 | 900 | 10 | 32 | Do. |

The treatments outlined above are typical of a much larger number conducted to determine the effect of varying the conditions of treatment. In general, these indicated that surface damage could be minimized or eliminated by diluting the lithium salt bath employed and by decreasing either the time of treatment or the rate of cooling thereafter. Optimum strengthening appeared to be obtained with ion exchange times varying from about 1 minute to about 5 minutes. In no case did a time longer than about 5 minutes appear to effect any further increase in strength.

Although in the above-recited working examples of the invention a bath of molten salt was employed as the source of lithium ions and this is the preferred mode for carrying out the ion exchange process, it will be understood that other sources of lithium ions can be utilized which are useful at the temperatures operable in this invention. Hence, the use of pastes and vapors is well-known in the ion exchange staining arts. Also, it will be apparent that the greatest depth of exchange will normally be accomplished where pure lithium ion-containing materials are utilized as the exchange media although some contamination thereof can be tolerated. However, since lithium is such a highly mobile ion, the speed of the exchange may be so rapid that good control thereof is difficult. In such cases, a "diluent" ion, like the sodium ion employed in the working examples, is included. Nevertheless, the determination of the maximum amount of contamination that can be tolerated is believed to be well within the technical ability of a person of ordinary skill in the art.

This invention involves the exchange of lithium for sodium ions in the crystal structure of nepheline accompanied with the conversion of nepheline to a low expansion lithium aluminosilicate-type crystal. This conversion can be confirmed through X-ray diffraction analysis of the surface crystals prior to and after the ion exchange reaction with the subsequent heat treatment unless the exchange itself has been undertaken at high temperatures. Thus, the following table records several of the $d$-spacings and the intensities observed thereat in an X-ray diffraction pattern made of the surface crystallization before and subsequent to the ion exchange reaction utilizing a 100 mole percent $LiNO_3$ bath at 450° C. for five minutes followed by a five-minute heat treatment in air at 875° C. The intensities observed thereat are arbitrarily reported as very strong (v.s.), strong (s.), moderate (m.), and weak (w.).

| Before exchange | | After exchange + heat treatment | |
|---|---|---|---|
| d | I | d | I |
| 8.76 | m. | 5.28 | m. |
| 5.04 | m. | 5.09 | w. |
| 4.35 | s. | 4.48 | m. |
| 4.19 | v.s. | 4.11 | w. |
| 3.87 | v.s. | 3.97 | s. |
| 3.23 | v.s. | 3.92 | s. |
| 3.02 | v.s. | 3.63 | m. |
| 2.90 | s. | 3.45 | v.s. |
| 2.67 | m. | 3.14 | m. |
| 2.51 | w. | 3.02 | s. |
| 2.40 | w. | 2.63 | s. |
| 2.34 | s. | 2.56 | m. |
| 2.31 | m. | 2.34 | w. |
| 2.13 | w. | 2.08 | w. |
| 2.09 | m. | 1.88 | s. |

This table is believed to clearly illustrate the transformation in crystal structure which the surface crystallization of nepheline undergoes during the ion exchange reaction and heat treatment. Hence, the X-ray diffraction pattern exhibited by the surface crystals after ion exchange with lithium ions and subsequent heat treatment approximates that demonstrated by a major phase of beta-eucryptite crystals with a minor phase of beta-spodumene and a very low trace of residual nepheline.

As has been observed above, since the glass-ceramic articles of this invention are highly crystalline, not only is the amount of residual glassy matrix small but also the composition thereof is quite different from that of the parent glass. Thus, in the preferred embodiment of the invention, essentially all of the alkali metal ions will be incorporated in the crystal structure of the nepheline and any other crystal phase present, leaving a residual glassy matrix composed principally of silica. Some alkali metal ion other than that forming part of the crystal phase can be tolerated but amounts in excess of about 5% by weight frequently result in a coarse-grained rather than the desired fine-grained article. It will be evident that these "contaminant" alkali metal ions in the residual glassy matrix can also be exchanged with the lithium ions during the ion exchange reaction, but, it is equally apparent that since the number of these ions is small and the total amount of residual glass is also very small, the effect of such exchange upon the properties of the article would be virtually negligible when compared with the effect produced by the exchange taking place within the nepheline crystals.

Finally, although nepheline constitutes the vast bulk of the crystals present in the glass-ceramic articles of this invention, minor amounts of other crystals can also be present. However, inasmuch as the existence of these extraneous crystals can dilute the maximum strengthening effect which can be attained where nepheline comprises the only crystal phase, it is much to be preferred to restrict the sum of all such incidental crystallization to less than about 20% of the total thereof.

From the foregoing, it will be seen that an effective method of strengthening nepheline-type glass-ceramic materials has been provided. Numerous variations and modifications other than those specifically disclosed will become readily apparent and are comprehended within the scope of the appended claims. In particular, other salt bath mixtures may be employed and similar strengthening effects may be attained on nepheline glass-ceramics generally.

I claim:

1. A unitary glass-ceramic article of high strength wherein the crystal content thereof constitutes at least 70% by weight of the article and having an integral surface compressive stress layer consisting essentially of beta-eucryptite and/or beta-spodumene as the crystal phase derived from nepheline crystals originally present in said surface and an interior portion consisting essentially of nepheline as the crystal phase.

2. A method for producing a unitary glass-ceramic article of high strength wherein the crystal content thereof constitutes at least 70% by weight of the article and having an integral surface compressive stress layer and an interior portion which comprises contacting a glass-ceramic article consisting essentially of $Na_2O$, $Al_2O_3$, MgO, $SiO_2$ and $TiO_2$ and consisting essentially of nepheline as the crystal phase at a temperature between about 400°–750° C. with a source of exchangeable lithium ions for a period of time sufficient to replace at least part of the sodium ions of said nepheline in a surface layer of the article with lithium ions and then heating said article to a temperature between about 750°–900° C. for a period of time sufficient to convert said nepheline crystals containing lithium ions in the surface layer of the article to beta-eucryptite and/or beta-spodumene, thereby effecting an integral compressively stressed surface layer on the article.

3. A method according to claim 2 wherein said glass-ceramic article is contacted with a source of exchangeable lithium ions at a temperature between about 400°–750° C. for a period of time of about 1–15 minutes.

4. A method according to claim 2 wherein said glass-ceramic article is heated between about 750°–900° C. for a period of time of about 1–10 minutes to convert the lithium ion-substituted nepheline crystals to beta-eucryptite and/or beta-spodumene crystals.

5. A method for producing a unitary glass-ceramic article of high strength wherein the crystal content thereof constitutes at least 70% by weight of the article and having an integral surface compressive stress layer and an interior portion which comprises contacting a glass-ceramic article consisting essentially of $Na_2O$, $Al_2O_3$, MgO, $SiO_2$ and $TiO_2$ and consisting essentially of nepheline as the crystal phase at a temperature between about 750°–900° C. with a source of exchangeable lithium ions for a period of time sufficient to replace at least part of the sodium ions of said nepheline in a surface layer of the article with lithium ions to convert said nepheline to beta-eucryptite and/or beta-spodumene, thereby effecting an integral compressively stressed surface layer on the article.

6. A method according to claim 5 wherein said glass-ceramic article is contacted with a source of exchangeable lithium ions for a period of time of about 1–10 minutes.

References Cited

UNITED STATES PATENTS

| | | | |
|---|---|---|---|
| 2,779,136 | 1/1957 | Hood et al. | 65—30X |
| 3,218,220 | 11/1965 | Weber | 65—30X |
| 3,282,770 | 11/1966 | Stookey et al. | 65—30X |
| 3,428,513 | 2/1969 | Denman | 65—33X |

OTHER REFERENCES

Kistler, S. S.: "Stresses in Glass Produced by Non-Uniform Exchange of Monovalent Ions," O. of Am. Cer. Soc., vol. 45, No. 2, pp. 59–68, February 1962.

S. LEON BASHORE, Primary Examiner

J. H. HARMAN, Assistant Examiner

U.S. Cl. X.R.

65—33; 106—39